(12) United States Patent
Gramling et al.

(10) Patent No.: US 11,175,262 B2
(45) Date of Patent: Nov. 16, 2021

(54) METHOD FOR INSPECTION OF POLYMERIC MATERIAL WITH FERROUS REINFORCEMENT TO DETERMINE PRESENCE OF REINFORCEMENT JOINT OR DAMAGE

(71) Applicant: COMPAGNIE GENERALE DES ETABLISSMENTS MICHELIN, Clermont-Ferrand (FR)

(72) Inventors: Frank E. Gramling, Greenville, SC (US); David A. Judd, Mauldin, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 47 days.

(21) Appl. No.: 16/625,653

(22) PCT Filed: Jun. 30, 2017

(86) PCT No.: PCT/US2017/040247
§ 371 (c)(1),
(2) Date: Dec. 20, 2019

(87) PCT Pub. No.: WO2019/005097
PCT Pub. Date: Jan. 3, 2019

(65) Prior Publication Data
US 2021/0156823 A1 May 27, 2021

(51) Int. Cl.
*G01N 27/83* (2006.01)
(52) U.S. Cl.
CPC .................... *G01N 27/83* (2013.01)

(58) Field of Classification Search
CPC ....................................................... G01N 27/83
(Continued)

(56) References Cited

U.S. PATENT DOCUMENTS

| 4,538,107 A | * | 8/1985 | Varone | G01N 27/82 324/206 |
| 5,446,379 A | * | 8/1995 | Machi | G01N 27/82 324/240 |

(Continued)

FOREIGN PATENT DOCUMENTS

| WO | 2010076532 A1 | 7/2010 |
| WO | 2010117855 A1 | 10/2010 |

(Continued)

OTHER PUBLICATIONS

PCT/US2017/040247 International Search Report and Written Opinion dated Feb. 28, 2018, 12 pages.

*Primary Examiner* — Christopher P McAndrew
(74) *Attorney, Agent, or Firm* — Hahn Loeser & Parks LLP; Bret A. Hrivnak (57) ABSTRACT

The present disclosure describes methods of inspecting polymeric material that includes one or more elongated ferrous reinforcements. The method includes applying a magnetic field to any one or more reinforcements. The method further includes positioning an array of magnetic flux sensors near the one or more reinforcements, and detecting the presence of magnetic flux leakage along any of the one or more reinforcements. It is then determined whether the magnetic flux leakage occurs at a damaged location along the one or more reinforcements or at a reinforcement joint.

12 Claims, 7 Drawing Sheets

(58) Field of Classification Search
USPC ........................................................ 324/228
See application file for complete search history.

(56) References Cited

U.S. PATENT DOCUMENTS

| | | | | |
|---|---|---|---|---|
| 5,559,437 | A * | 9/1996 | Baccaud | G01N 27/72 |
| | | | | 209/538 |
| 5,777,469 | A * | 7/1998 | Hockey | G01N 27/9053 |
| | | | | 324/238 |
| 6,005,388 | A * | 12/1999 | Kaefer-Hoffmann | ........................ |
| | | | | G01N 27/82 |
| | | | | 209/538 |
| 6,014,024 | A * | 1/2000 | Hockey | G01N 27/82 |
| | | | | 324/225 |
| 2012/0038357 | A1 * | 2/2012 | Brandon | G01N 27/82 |
| | | | | 324/251 |

FOREIGN PATENT DOCUMENTS

| | | |
|---|---|---|
| WO | 2014077846 A1 | 5/2014 |
| WO | 2015065357 A1 | 5/2015 |
| WO | 2015137951 A1 | 9/2015 |
| WO | 2015137953 A1 | 9/2015 |
| WO | 2016032492 A1 | 3/2016 |
| WO | 2016111671 A1 | 7/2016 |
| WO | 2016111964 A1 | 7/2016 |
| WO | 2016175783 A1 | 11/2016 |
| WO | 2017023235 A1 | 2/2017 |

* cited by examiner

METHOD FOR INSPECTION OF POLYMERIC MATERIAL WITH FERROUS REINFORCEMENT TO DETERMINE PRESENCE OF REINFORCEMENT JOINT OR DAMAGE

FIELD

The subject matter of the present disclosure relates generally to the detection of damage to elongated, ferrous reinforcement of polymeric materials and articles constructed from such materials.

BACKGROUND

Polymeric materials reinforced with ferrous material such as steel cables or cords are commonly used in the construction of tires, belts, and other articles of manufacture. By way of example, tissues, belts, or sheets constructed of rubber-based materials with ferrous reinforcements are commonly used in one or more layers that are joined together to manufacture a tire. One known tire construction uses a body ply having reinforcement elements that extend from bead portion to bead portion through opposing sidewall portions, and a crown portion of the tire. Sometimes referred to as the carcass ply or reinforcing ply, the body ply is typically anchored at the beads and maintains the overall shape of the tire as the tire is inflated and used. Multiple elongated reinforcement elements are arranged in a parallel manner within the body ply are usually oriented substantially along the radial direction (a direction orthogonal to the axis of rotation) of the tire. The reinforcement elements commonly include a ferrous metal, such as steel.

Inspection of the elongated, ferrous reinforcements may be desirable during manufacture of an article or during its use. For example, in manufacturing a tire from reinforced sheets or layers, it may be useful to inspect the ferrous reinforcements during the manufacturing process. During use of the tire, these reinforcement elements (sometimes referred to as cords) may be damaged, e.g., from impact with objects in the roadway, travel over curbs, and other damaging events. In some situations, the reinforcement elements may be completely or partially broken as a result of such an event.

Whether during manufacture or use, inspection of the reinforcement elements for damage such as breaks may not by possible by visual inspection alone because the reinforcement elements are enclosed within polymeric material. For example, a visual inspection of the exterior of the tire may not reveal breaks in the ferrous reinforcements that are contained within the rubber materials used to construct the tire. A similar problem exists with certain components used to make the tire.

Commercial tires are commonly reused after a process referred to as retreading. With retreading, worn tread is removed from the tire and a new tread belt or tread section is installed onto the tire. Replacement of the tread is less expensive than replacing the whole tire and allows additional mileage to be obtained using the same tire carcass. This practice is common particularly with commercial tires for heavy trucks.

Before replacing the tread, however, it is advantageous to inspect the tire, including the reinforcement elements of the body ply, for damage and wear. In certain situations, inspection may reveal that replacement of the tire is required rather than retreading. Alternatively, the damaged tire may be repaired.

Techniques have previously been developed whereby a magnetic field has been applied to ferrous reinforcements, where such reinforcements are then inspected using one or more sensors, such as an array of hall-effect sensors. In certain instances, however, it has been determined that tires inspected using these techniques have been unnecessarily discarded or repaired when these inspection techniques improperly identify a joint arranged along a ferrous reinforcement as a damaged reinforcement.

It is common for the terminal ends of ferrous reinforcements to be joined together using any of a variety of techniques when forming reinforced polymeric material, which may take the form of sheets, for example, for use in tire construction. Common techniques for joint ends of ferrous reinforcements include using of wire-mesh sleeves in which opposing terminal ends are inserted, welds, or twists/knots. Therefore, there is a need to better distinguish between damaged ferrous reinforcements and joints arranged along ferrous reinforcements that may properly exist within a usable tire.

SUMMARY

The present disclosure describes methods of inspecting polymeric material that includes one or more elongated ferrous reinforcements. The method includes applying a magnetic field to any one or more reinforcements. The method further includes positioning an array of magnetic flux sensors near the one or more reinforcements, and detecting the presence of magnetic flux leakage along any of the one or more reinforcements. It is then determined whether the magnetic flux leakage occurs at a damaged location along the one or more reinforcements or at a reinforcement joint.

DETAILED DESCRIPTION OF THE DRAWINGS

The foregoing and other objects, features, and advantages will be apparent from the following more detailed descriptions of particular embodiments, as illustrated in the accompanying drawings wherein like reference numbers represent like parts of particular embodiments.

DETAILED DESCRIPTION OF PARTICULAR EMBODIMENTS

This disclosure introduces a method of inspecting polymeric material within a tire, where magnetic flux leakage detected, as an anomaly, is determined to be either a ferrous reinforcement joint or a damaged reinforcement. If it is determined that a joint is present without any other notable damaged reinforcement(s), the tire may remain usable without repair or being discarded.

It is known that polymeric material may include one or more elongated ferrous reinforcements, such as those that form a cord or cable. This polymeric material may be used to form any portion of the tire, including any reinforced ply or layer of polymeric material arranged within the tire, such as, for example, a body ply. A body ply is also referred to as a carcass ply, which generally extends between and from each bead spaced apart axially along the tire. It is appreciated that this method of inspection may be employed to inspect any new or used tire. For example, in particular instances, the tire comprises a used tire for use in retreading operations, where the polymeric material being inspected is a body ply extending between opposing beads of the tire.

Figure 6:
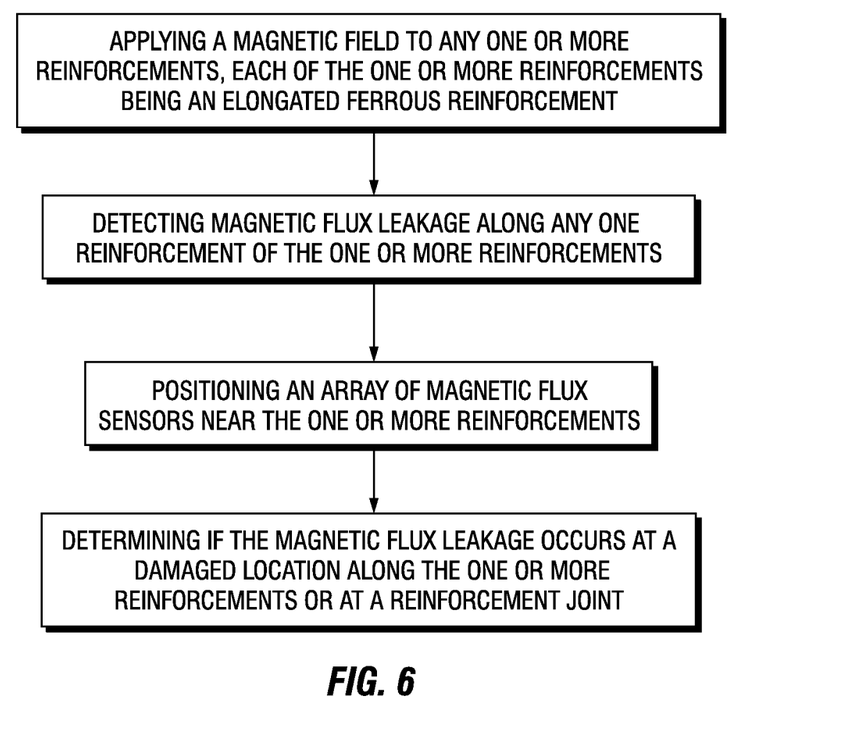
FIG. 6 is a flow chart for performing a method of the present disclosure.

The method of inspection, which is generally represented in a flow chart in FIG. 6, includes applying a magnetic field to any one or more reinforcements, each of the one or more reinforcements being an elongated ferrous reinforcement. The method of inspection further includes positioning an array of magnetic flux sensors near the one or more reinforcements, and detecting magnetic flux leakage along any the one or more reinforcements.

Methods are known for imparting a magnetic field in ferrous reinforcements arranged within a tire, and using a plurality of magnetic field responsive sensors to detect the presence of magnetic flux leakage.

In any such method, it is appreciated that any one or more magnets of any desired type may be employed. For example, each of the one or more magnets may comprise a permanent magnet or an electromagnet, for example, each of which may be used in any desired shape or form. As for the plurality of magnetic field responsive sensors, the plurality includes an array including at least a pair sensors and may include as many sensors as desired. It is appreciated that each sensor may form any magnetic field responsive sensor desired, such as a hall-effect sensor or magneto-resistive sensor, for example, capable of detecting magnetic flux and generating a signal indicative of the presence of magnetic flux and the magnetic flux density.

Figure 1A:
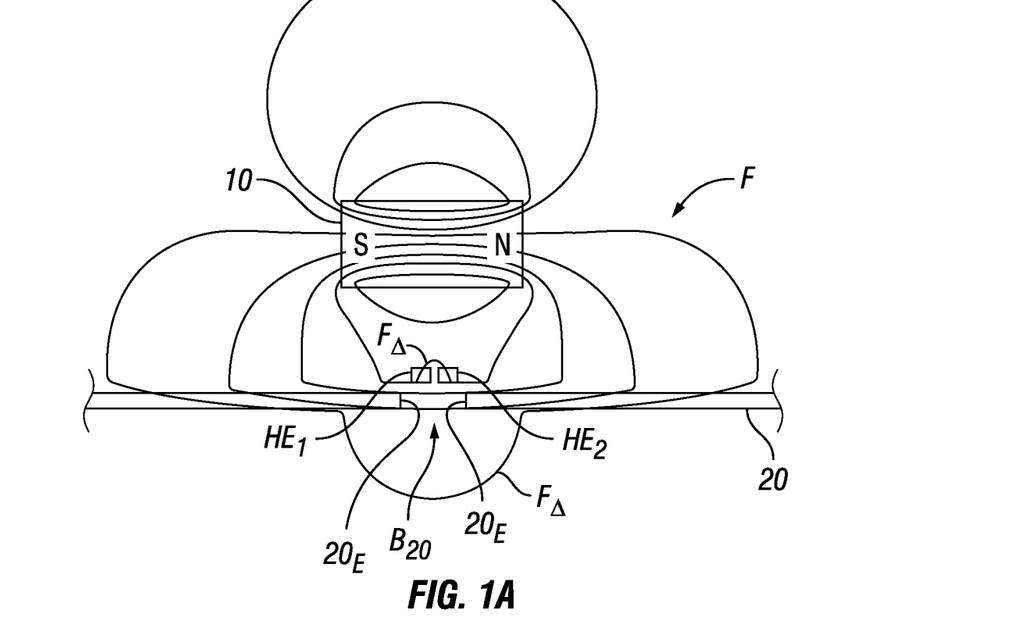
FIG. 1A is a front view of a magnet with a pair of magnetic field responsive sensors arranged to inspect magnetic flux leakage near a damaged area occurring along an elongate, ferrous reinforcement in polymeric material.
Figure 1B:
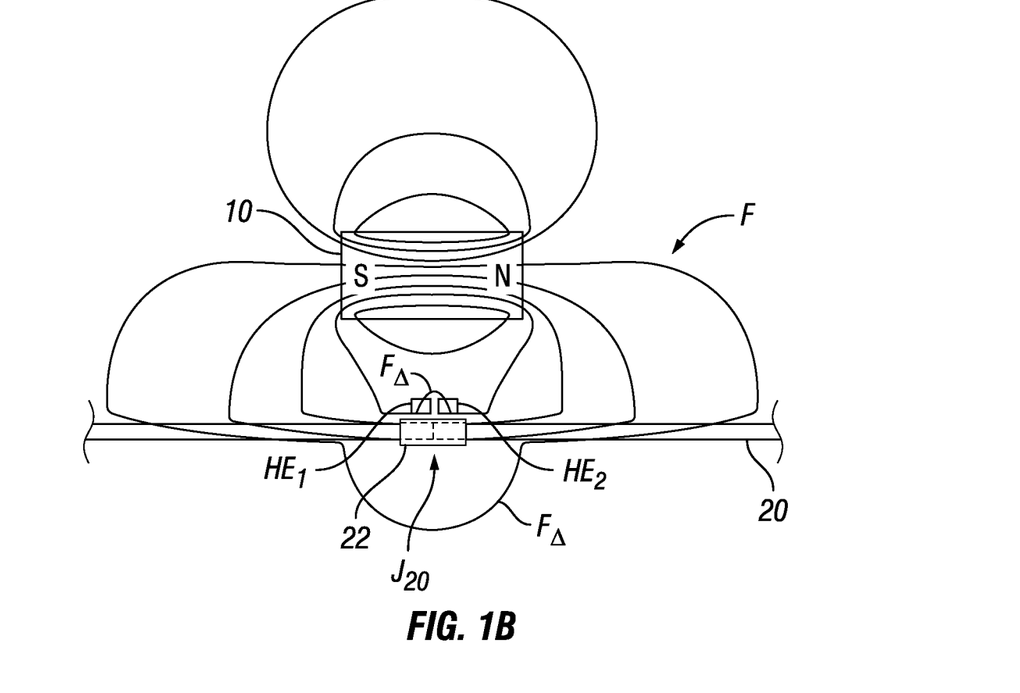
FIG. 1B is a front view of a magnet with a pair of magnetic field responsive sensors arranged to inspect magnetic flux leakage near a joint arranged along an elongate, ferrous reinforcement in polymeric material.
Figure 2:
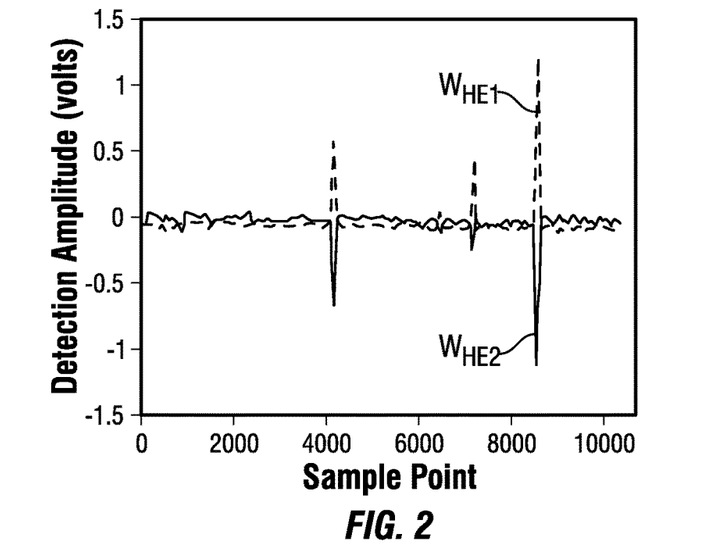
FIG. 2 graphically illustrates filtered and averaged data collected during an automated sweep examination of a tire.
Figure 3:
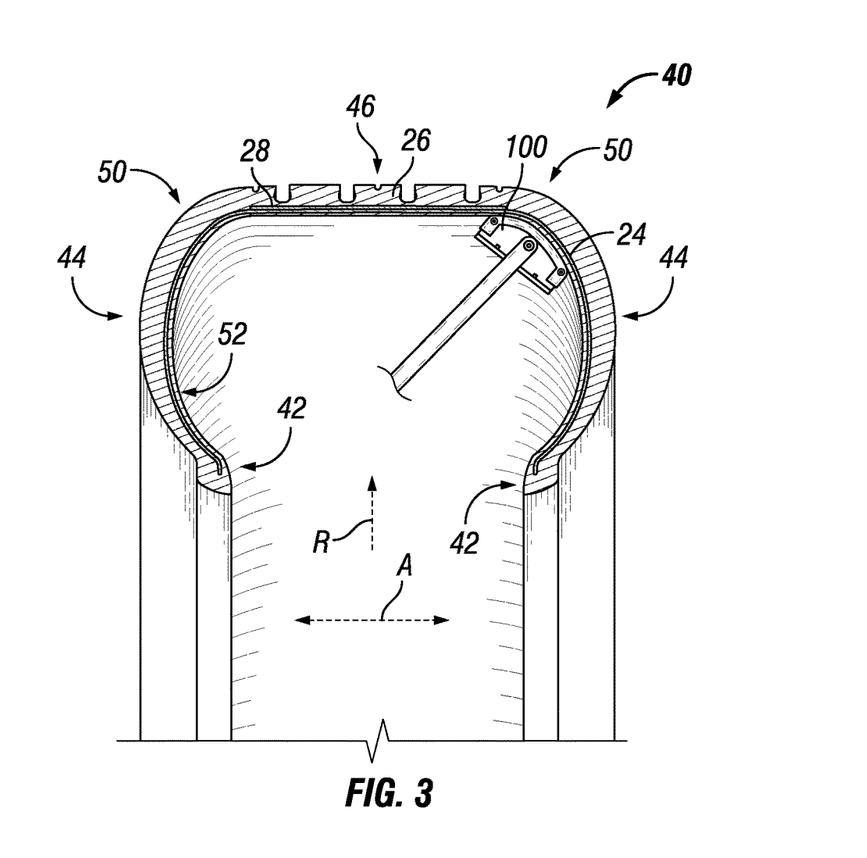
FIG. 3 is a sectional view of a tire taken along a meridian plane of the tire showing a sensor device configured to inspect elongate, ferrous reinforcements within the tire.

Reference is now made to FIGS. 1 to 3, which are helpful to describe how a magnetic field is generally formed and how the magnetic field responsive sensors are employed to detect magnetic flux leakage and anomalies in the field.

With specific reference to FIG. 1A, a magnet 10 is shown generating a magnetic field F across a pair of Hall effect sensors HE1, HE2 and elongate, ferrous reinforcement 20 arranged within polymeric material. Sensors HE1, HE2 are arranged between the magnet 10 and reinforcement 20 in a side-by-side arrangement spaced-apart along a common line in the direction of ferrous reinforcement 20, although other arrangements may be permitted whereby a magnetic field is still generated across sensors HE1, HE2 and a reinforcement 20 to be inspected. Generally, each of the magnet 10, the side-by-side arrangement of sensors HE1, HE2, and the extension (length) of reinforcement 20 are generally arranged in parallel, noting that slight/minor deviations from a strict parallel arrangement may be permitted. It is observed that flux field F is generated from north N and south S poles of magnet 10, where a disruption $F_A$ in flux field F (detected as flux leakage) arises at a damage break $B_{20}$ in reinforcement 20 (at reinforcement ends $20_E$) to form an anomaly. In FIG. 1B, magnet 10 and pair of sensors HE1, HE2 is also used to identify flux leakage forming a disruption $F_A$ in flux field F at a joint $J_{20}$ in reinforcement 20, where a wire mesh sleeve 22 joins terminal reinforcement ends.

An anomaly arising along an elongate, ferrous reinforcement will result in a change in the magnetic field presented to magnetic field responsive sensors. With reference again to FIGS. 1A and 1B, it will be appreciated by those of ordinary skill in the art that the flux lines for magnetic field F deviate from a prior path and instead extend along an alternative path in the area of each anomaly, identified in FIG. 1A as a break $B_{20}$ and in FIG. 1B as a reinforcement joint $J_{20}$. Each anomaly produces detectable levels of perpendicular field patterns not present in the prior field pattern. More specifically, any such anomaly noted above will produce, to varying degrees, detectable variations in the magnetic field due to the generation of at least some perpendicular extension of the flux field, relative to a prior flux path, to the lengthwise extension of the reinforcement being inspected, and/or to the common line along which the sensors are arranged. In the specific instances depicted, these anomalies may be detected as differences between the signals generated between sensors HE1, HE2. The signals received from sensors HE1, HE2 in each embodiment shown in FIGS. 1A and 1B are generally exemplified in FIG. 2. Specifically, the chart in FIG. 2 shows the results of multiple responses received (represented along the X-axis) from the pair of sensors HE1, HE2 for multiple scans taken around a circumference of a tire. Other analysis of Hall effect signals may be made, however, of variations in magnetic fields. Accordingly, it is appreciated that the term difference is not meant to describe only a mathematical subtraction of one signal from another, but rather to more broadly include various forms of analysis that seek to analyze identifiable differences between signals generated by at least one pair of sensors.

In evaluating the signals obtained from each sensor, the signal data may be re-sampled and averaged, resulting in a waveform for each sensor of 10,800 points around the circumference of the tire. A filter may also be applied, such as a $5^{th}$ order Butterworth filter. In an exemplary configuration, the cutoff frequency of the filter may be set to 0.025. In any event, this cutoff frequency value must be set between 0 and 1 and represents a proportional frequency of the raw data frequency content. The result of this step results in filtered waveforms $W_{HE1}$, $W_{HE2}$ shown in FIG. 2, by example. More specifically, waveform $W_{HE1}$ corresponds to a re-sampled and filtered signal from sensor HE1, while waveform $W_{HE2}$ corresponds to a similar signal from sensor HE2. It will be noted that the opposite direction spikes occur simultaneously as the sensors react to anomalies within the tire. Lesser anomalies are displayed as lesser amplitude signals while more significant anomalies are identified by larger amplitude signals. In this instance, the signals represented by waveforms $W_{HE1}$, $W_{HE2}$ are measured in terms of volts (V) in the vertical axis while samples numbers are shown along the horizontal axis. Following re-sampling and filtering, both sensor signals are simultaneously processed using a sliding window. In this window, the slope of each sensor signal is calculated and compared to each other and to a threshold value. If the slopes are opposite to each other and if each slope is greater than the threshold value, an output slope magnitude waveform representing the combined slope magnitude is produced. The slope magnitude waveform may then be processed by searching the waveform point by point to determine the presence of a signature signal identified by a positive slope followed relatively quickly by a negative slope. The time difference between the detection of a positive and negative slope each exceeding a predetermined threshold may be based on a known anomaly size. If such a signature is encountered, an output waveform is produced from the combined sensor HE1 and sensor HE2 magnitudes. This results in a waveform with positive spikes representing the combined amplitude of sensor HE1's negative spike and sensor HE2's positive spike. The resulting waveform can be visually inspected and, if desired, a table of values may also be produced that can be inspected in terms of magnitude and spike width.

It is appreciated that any magnet and/or magnetic field responsive sensors, such as those illustrated in FIGS. 1A-1B, may be mounted on a machine or other device configured to rotate a tire or the sensor assembly to position the sensor assembly in a radial fashion on the inside surface of the tire carcass thereby effectively presenting the entire inside surface of the tire carcass to the sensors for reinforcement inspection. Each sensor may be coupled to a computer system or more generally any logic controller, which may employ an encoder, to provide positional feedback allowing for precise information of the sensor assembly location in relation to the tire surface whereby localization, size, including number of reinforcements involved, and severity of anomalies can be presented to an operator. Collected data may be stored temporarily or more permanently for post processing using a number of different methodologies but each employing analysis methods that examine signals from one or more pairs or an array of sensors that look for identifiable differences in the signals.

With specific reference to an exemplary implementation for performing the methods discussed herein, which incorporates any magnets and magnetic field responsive sensors previously discussed, FIG. 3 depicts an exemplary sensor device 100 arranged along tire 40 for inspection of elongate, ferrous reinforcements arranged therein. Tire 40 is shown in a cross-section taken along a meridian plane of the tire. Tire 40 includes spaced-apart bead areas 42, each of which include a bead (not shown). A body ply 24 extends from a one bead area 42 and to the other bead area 42. In doing so, body ply 24 also extends through both sidewalls 44 and through crown area 46. Crown area 46 includes a tread 26 and belt plies 28 located radially inward of tread 26. Also shown in FIG. 3 is the radial direction R and the axial direction A of the tire.

With continued reference to FIG. 3, sensor device 100 is removably positioned at a shoulder area 50, which is located at a junction of one sidewall 44 and the crown area 46/tread 26. In this location along inner tire surface 52, sensor device 100 will inspect the elongate, ferrous reinforcements arranged within body ply 24, as body ply 24 is a reinforced ply of polymeric material. When a sensor device is positioned along a tire for inspection, the sensor device is typically placed very close, such as by contacting the tire up to being within 5 mm to 6 mm of an exposed tire surface. Once positioned, the tire can be rotated about its rotational axis to scan any partial or full circumference of the tire to detect the presence of any anomalies in the magnetic flux field by identifying locations of sufficient magnetic flux leakage.

Figure 4:
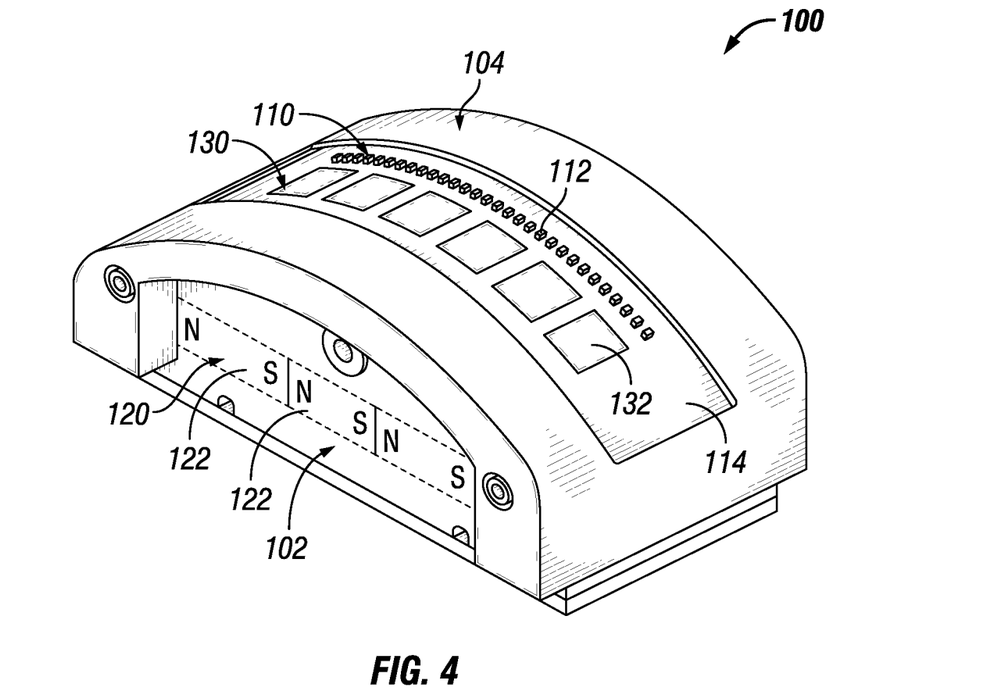
FIG. 4 is a side perspective view of the sensor device shown in FIG. 3.
Figure 5:
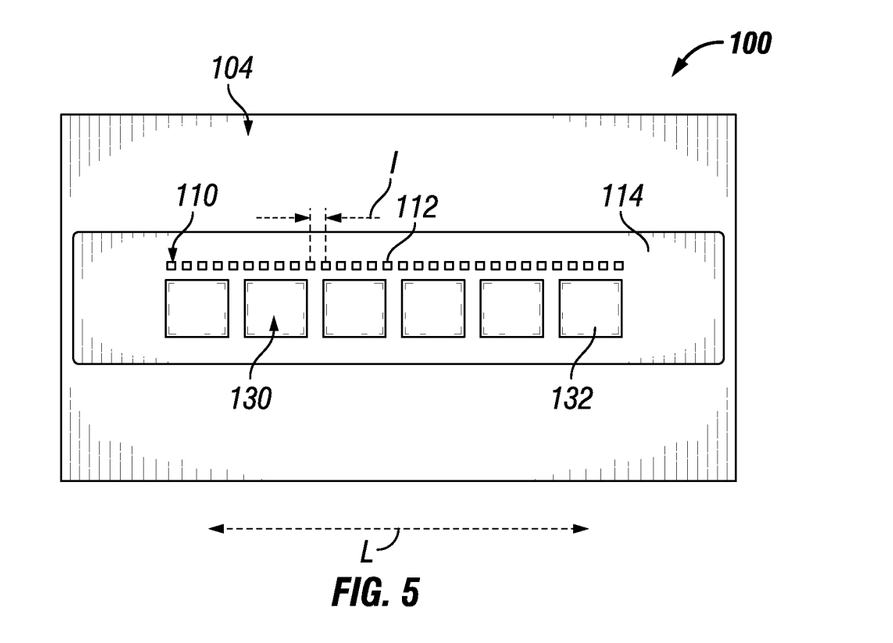
FIG. 5 is a top view of the sensor device shown in FIGS. 3 and 4.

With specific reference to the different views shown in FIGS. 4 and 5, sensor device 100 includes a sensor array 110 located proximate to outermost inspection surface 104. Sensor array 110 includes a plurality of magnetic field responsive sensors 112. Sensors 112 are Hall-Effect sensors, which detect magnetic flux and generate a signal indicative of the presence of magnetic flux and the magnetic flux density. The plurality of sensors 112 are arranged linearly and adjacent to each other, and define a longitudinal direction L that is within a meridian plane of tire 40 when sensor device 100 is positioned for inspection of tire 40. Any number of Hall-Effect sensors 112 may be used depending upon the detection length desired for sensor array 110. In the embodiment shown, sensor array 110 includes thirty-two (32) Hall-Effect sensors 112 positioned at intervals I. While any desired interval I may be employed, in particular instances, interval I is about 2.5 mm. It is appreciated that using more than less sensors and/or sensors arranged at closer than wider intervals, increases the effectiveness of the sensor device. It is appreciated that multiple sensor arrays may be provided, each arranged in parallel, for example.

With specific reference to FIG. 4, sensor device 100 includes a magnet array 120 arranged within a compartment to create a magnetic field about the ferrous reinforcements to be inspected. Magnet array 120 includes a plurality of magnets 122 arranged sequentially with alternating polarity as shown. As herein, "arranged sequentially with alternating polarity" means adjacent magnets 122 are oriented with opposite poles facing each other, such as N-S/N-S/N-S or S-N/S-N/S-N, for example. It is noted that the magnet array 120 is arranged on body 102 so that sensor array 110 is arranged closer to inner tire surface 52 than magnet array 120. In particular variations for any embodiment, any magnet array may be arranged on a sensor device such that the sensor array is between at least a portion of the magnet array and a tire when the sensor device is positioned there along for tire inspection. It is appreciated that a magnet array may have two or more magnets. In lieu of an array, a single magnet may be employed. Also, in lieu of including any magnets within the sensor device, one or magnets may are otherwise be separately provided.

Optionally, sensor device 100 also includes a proximity sensor array 130 including a plurality of tire proximity sensors 132 arranged in a spaced-apart relationship in the longitudinal direction L of body 102. "Tire proximity sensor" refers to a sensor that can detect whether body 102 is within a certain distance or proximity to tire 40 (e.g., a surface of the tire of a component thereof). For example, tire proximity sensors 132 can determine whether body 102 of device 100 is within a certain range of distance between sensor support surface 104 and an inner tire surface 52 such that magnetic field responsive sensors 112 can properly detect damage and joints arranged along the ferrous reinforcements 20 of body ply 24. The proximity required may vary depending upon the type, range, and sensitivity of sensors 112. By way of example, tire proximity sensors 132 may form capacitive sensors or any other type of proximity sensor. It is appreciated that each of the magnetic field responsive sensor array 110 and proximity sensor array 130 are each arranged along a circuit board 114, although it is appreciated that each may be arranged on separate circuit boards or on any other medium as desired.

In other embodiments, a sensor device similar in function to any sensor device discussed or contemplated herein may be adapted to a shape more useful for positioning at other locations of the tire. For example, the sensor device may be of a shape or configuration more suited for tire inspection at either of the opposing bead portions (42) of tire (40) (for reference, see exemplary tire in FIG. 3). The sensor device may be configured for inspection at other locations of tire as well.

Figure 7:
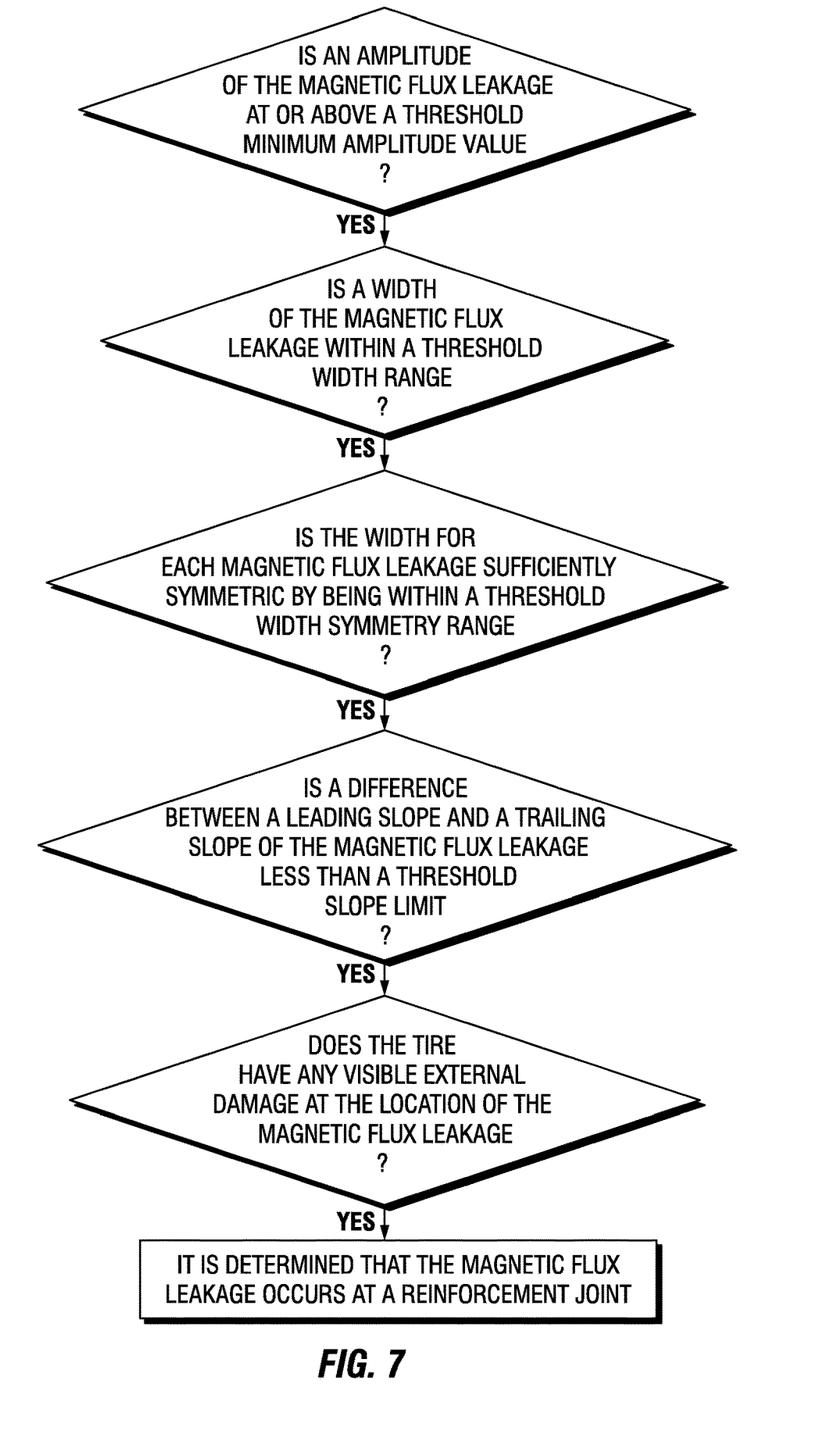
FIG. 7 is a flow chart for determining if magnetic flux leakage indicates damage to a ferrous reinforcement or a joint of ferrous reinforcement.

The method of inspection also includes determining if the magnetic flux leakage occurs at a damaged location along any one or more reinforcements or at a joint arranged along any reinforcement. In particular embodiments, the step of determining if the magnetic flux leakage occurs at a damaged location or at a joint includes:
  determining whether an amplitude of the magnetic flux leakage is at or above a threshold minimum amplitude value;
  determining whether a width of the magnetic flux leakage is within a threshold width range;
  determining whether the width for each magnetic flux leakage is sufficiently symmetric by being within a threshold width symmetry range;
  determining whether a difference between a leading slope and a trailing slope of the magnetic flux leakage is less than a threshold slope limit;
  inspecting externally the tire for any visible external physical damage at the location of the magnetic flux leakage; and,
  determining that the magnetic flux leakage occurs at a joint arranged along a reinforcement if:
  the amplitude is at or above the threshold minimum amplitude value;
  the width of the magnetic flux leakage is within the threshold width range;
  if the width for each magnetic flux leakage is sufficiently symmetric by being within the threshold width symmetry range;
  if the difference between the leading slope and the trailing slope of the magnetic flux leakage is less than the threshold slope limit; and,
  if no external physical damage is observed at the location of the magnetic flux leakage.
These steps are also shown more generally in the flow chart FIG. 7.

Variations to this process may exist based upon circumstance-specific details or variations. For example, variations may arise based upon the type and/or spacing of magnetic field responsive sensors employed, the sampling rate of the magnetic field responsive sensors employed, and the physical attributes of the elongate, ferrous reinforcements being inspected, and the physical attributes of the reinforcement joint employed.

One characteristic (parameter) that can be useful in evaluating to determine whether magnetic flux leakage occurs at a damaged location or at a joint arranged along a ferrous reinforcement is the amplitude of the signal received from any magnetic field responsive sensor. Because a joint includes a pair of free reinforcement ends, much like a single broken reinforcement, a joint does generate a signal having minimum amplitude—that is, one that sufficiently rises to a level to otherwise indicate reinforcement damage. Therefore, a minimum amplitude threshold may be useful to at least indicate that an anomaly is present—whether or not it indicates a joint or damage. This eliminates considering signals that do not rise to a minimum amplitude, which operates as a way to filter out noise. However, because a joint only affects a single reinforcement, unlike most damage that concerns multiple reinforcements, a maximum amplitude threshold may be used to filter out signals of greater amplitude that identify anomalies clearly representing damage and not any single reinforcement joint. In conclusion, while a minimum and/or maximum amplitude threshold may not alone distinguish between a joint and damage, it is at least useful to filter out signals that either amount to noise and signals that clearly represent reinforcement damage. Accordingly, an optional step in determining whether an anomaly indicates reinforcement damage or a reinforcement joint includes determining whether an amplitude of the magnetic flux leakage is at or above a threshold minimum amplitude value. In addition or separately, one may also determine whether the amplitude is less than a threshold maximum amplitude value.

Another characteristic (parameter) useful in determining if magnetic flux leakage occurs at a damaged reinforcement location or at a reinforcement joint is the width of the sensed anomaly. This is because a joint only affects a single reinforcement, while tire damage most commonly affects more than one reinforcement. Therefore, it is useful for determining if the magnetic flux leakage occurs at a damaged reinforcement location or at a reinforcement joint to determine whether a width of the magnetic flux leakage is within a threshold width range. However, this determination alone may not be conclusive when trying to distinguish between reinforcement damage and a reinforcement joint. It is appreciated that the width of the flux leakage plume may depend on the number of reinforcements damaged, the number of filaments damaged in any reinforcement formed of multiple filaments, and the physical disarray of the break. For example, it is appreciated that a single fully broken reinforcement may have a wider flux plume than four (4) partially broken reinforcements. By further example, it is appreciated that a single broken reinforcement having filaments widely spread out will have a wider flux plume than a cleanly severed reinforcement. Therefore, specifying a threshold width range defining a minimum and a maximum width could be helpful, if not determinative, in determining whether an anomaly is a reinforcement damage or a reinforcement joint.

In particular instances, if a minimum amplitude threshold was eclipsed and a measured width fell within a threshold width range, the anomaly would be considered a possible reinforcement joint. Optionally, if a minimum amplitude threshold was eclipsed and a measured width fell within a threshold width range, the anomaly would be considered a possible reinforcement joint if there is a single detection or a plurality of detections not exceeding a maximum detection limit within a single inspection zone. Also, whether or not including the optional step, if the prior steps indicate a possible reinforcement joint, an operator may be instructed to visually inspect the detection location for evidence of damage. If no visible damage is present, the detection will be presumed to be a reinforcement joint, and will "pass"

inspection for that zone. If other zones have detections, the tire may still be determined to "fail" the inspection.

Figure 8:
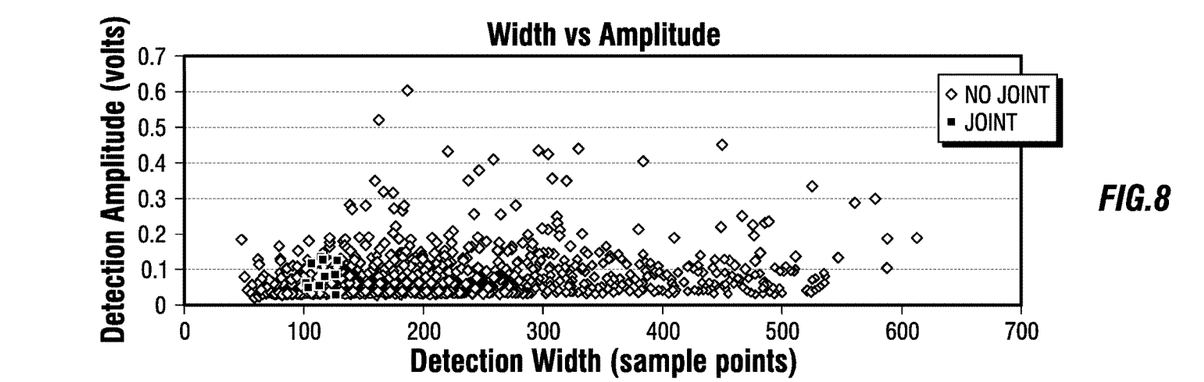
FIG. 8 is a chart showing anomalies previously identified by a sensing device based upon detection width (sample points) and detection amplitude (volts), the anomalies each being identified as representing a damaged reinforcement or a joint along a reinforcement.

To determine a minimum or maximum amplitude threshold, in particular instances, prior magnetic field responsive sensor samplings taken from particular tires are evaluated in conjunction with physical inspection of the tire at the location attributed to each detected anomaly to correlate the specific signal characteristic with anomalies that indicate a joint and with anomalies that indicate reinforcement damage. By example, with reference to FIG. 8, sensor samplings for a particular tire type and size and a particular sensor device are charted by plotting anomaly detection width (by sample points attributed to each anomaly), which is measured in sample points and plotted along the X-axis, against anomaly detection amplitude (indicating a peak-to-peak amplitude for each signal), which is measured in volts and plotted along the Y-axis. After inspecting each tire at the location of each anomaly, it was determined which sensed anomalies were attributed to reinforcement damage and which sensed anomalies were attributed to reinforcement joints. By doing so, anomalies associated with reinforcement joints were observed to have certain quantifiable signal amplitudes and anomaly widths—so to arrive at the thresholds previously discussed. For example, for a tire type and sizes analyzed using particular Hall-Effect sensors, based upon the chart in FIG. 8, a threshold minimum amplitude value of 0.03 volts was determined as was a threshold maximum amplitude value of 0.2 volts. Also, a threshold width range of 100 to 150 sample points was determined. In other variations, the threshold width range is expanded to 100 to 170 sample points. It is appreciated that the quantity of sample points will vary between tires of different sizes. In certain instances, a magnetic field responsive sensor array interrogates (samples) the tire 800 times per second, where a signal is obtained for each occurrence.

It is appreciated that magnetic flux leakage exiting a free end of a reinforcement joint generates a substantially symmetrical flux pattern. To the contrary, magnetic flux leakage for any damaged elongate reinforcements commonly generates a non-uniform or asymmetrical flux pattern. This distinction arises because the free reinforcement end at a joint is clean, while a damaged reinforcement is often uneven and frayed. Therefore, one distinctive characteristic (parameter) is the symmetry for any signal received from a magnetic field responsive sensor.

Figure 9:
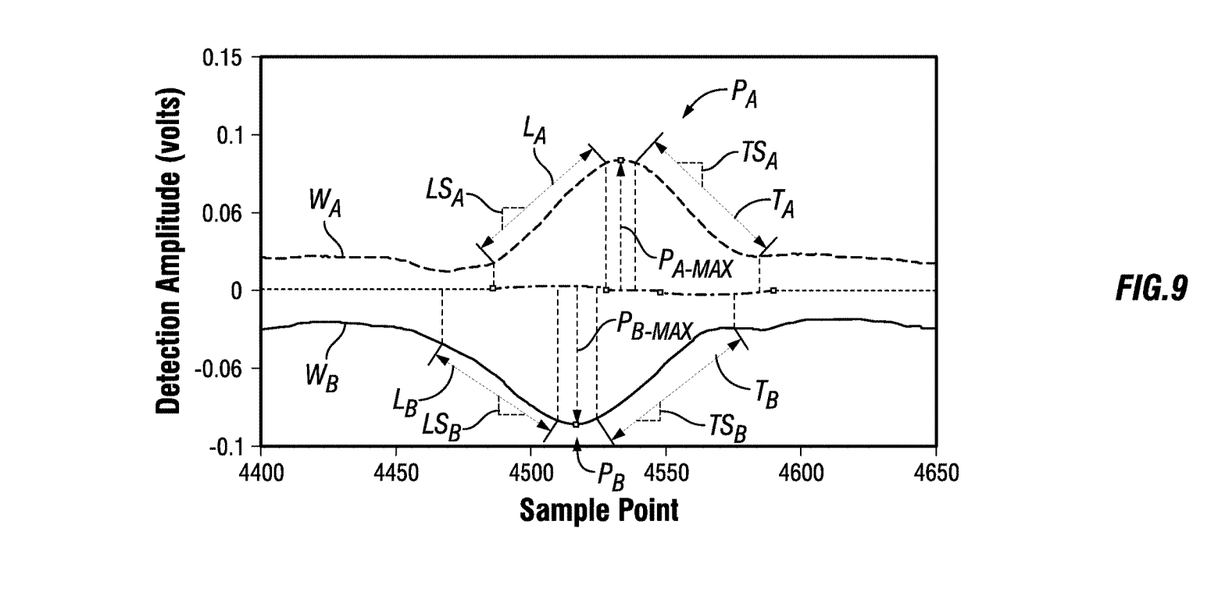
FIG. 9 is a chart showing the details of a pair of pulses obtained from a pair of magnetic field responsive sensors, each pulse having a leading and trailing slope.

With reference to FIG. 9, an exemplary pair of pulses $P_A$, $P_B$ are shown along a pair of waveforms $W_A$, $W_B$, each waveform $W_A$, $W_B$ being generated by plotting a plurality of sample points taken by a pair of magnetic field responsive sensors (such as shown in FIG. 1, by example), each waveform $W_A$, $W_B$ being generated by one sensor of the pair of sensors. In the plot, each sampling point is arranged along the X-axis by sampling point order and along the Y-axis by voltage. When there are opposed pulses $P_A$, $P_B$ for the two sensors, and the centers or peaks $P_{A-MAX}$, $P_{B-MAX}$ of the two pulses are in alignment within a given tolerance (such as 25 sample points, for example), it is identified as a detection (an anomaly), such as is shown in FIG. 9. Each pulse $P_A$, $P_B$ is characterized as having a peak $P_{A-MAX}$, $P_B$. MAX of increase amplitude sufficiently deviating from the common, local amplitude of the waveform. Each pulse $P_A$, $P_B$ is further characterized as having a corresponding leading segment $L_A$, $L_B$ each having a corresponding positive leading slope $LS_A$, $LS_B$ followed by a corresponding trailing segment $T_A$, $T_B$ each having a corresponding negative trailing slope $TS_A$, $TS_B$. This is achieved by dividing the waveform into leading segments $L_A$, $L_B$ and trailing segments $T_A$, $T_B$ about a corresponding peak $P_{A-MAX}$, $P_{B-MAX}$. The slope for each leading and trailing segment may be determined as known by one having ordinary skill, such as is disclosed by example in paragraph above. Accordingly, for each detection of an anomaly, there are four (4) slopes identified, namely, a positive and a negative slope for each magnetic field responsive sensor of a pair of sensors (not shown). Accordingly, based upon the foregoing information, a pair of pulses may be analyzed to determine whether sufficient symmetry exits that would permit a distinction between damaged reinforcements and reinforcement joints.

By way of example, the symmetry could be characterized using several factors: (a) an average value of the four (4) slope segments (volts/encoded sample point); (b) a difference between the slopes of the leading edge and of the trailing edge—for each sensor; (c) a difference between leading and trailing slope segment average slope; (d) a width (in sample points) of leading and trailing slope segments; and, (e) a circumferential difference between peaks for each of the leading and trailing slope segments for of a detection pair.

In certain instances, symmetry is assessed by determining the difference between the peak of the leading and trailing slope segments, with low values indicating a symmetric waveform, and higher values indicating an asymmetric form. Symmetry may also be assessed by comparing the slope of the leading and trailing segments of the detection waveform. This may be achieved by determining the difference between the leading slope and trailing slope of each detection waveform. Accordingly, in certain instances, in determining whether magnetic flux leakage occurs at a damaged location or at a joint it is useful to determine whether the width for each magnetic flux leakage is sufficiently symmetric by being within a threshold width symmetry range and/or determining whether a difference between a leading slope and a trailing slope of the magnetic flux leakage is less than a threshold slope limit.

Figure 10:
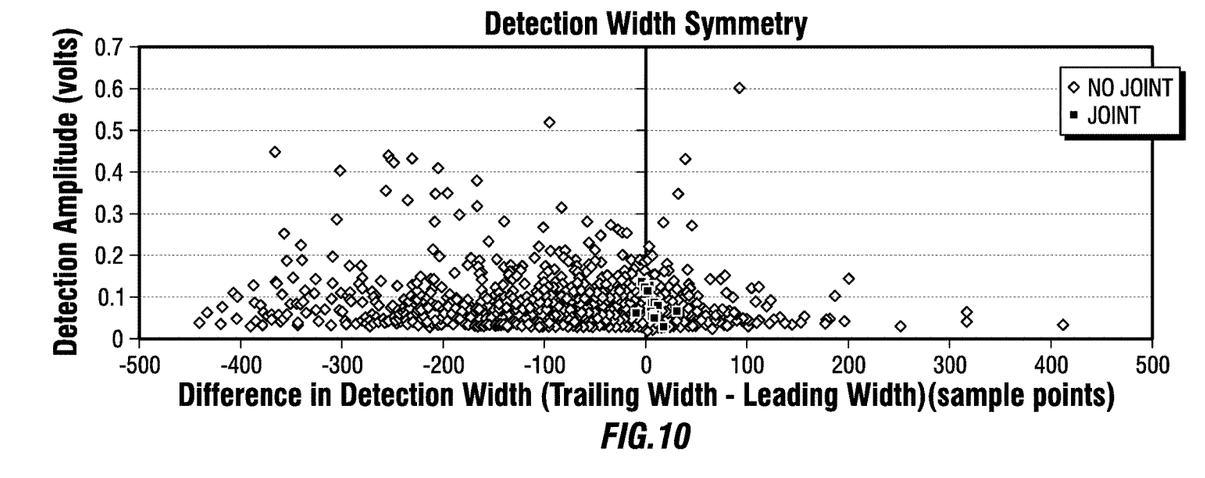
FIG. 10 is a chart showing anomalies previously identified by a sensing device based upon a difference between detection width between leading and trailing widths and detection amplitude (volts), the anomalies each being identified as representing a damaged reinforcement or a joint along a reinforcement.

To determine a threshold width symmetry range, in particular instances, prior magnetic field responsive sensor samplings taken from particular tires are evaluated in conjunction with physical inspection of the tire at the location attributed to each detected anomaly to correlate the specific signal characteristic with anomalies that indicate a joint and with anomalies that indicate reinforcement damage. By example, with reference to FIG. 10, sensor samplings for a particular tire type and size and a particular sensor device are charted by plotting the difference of leading and trailing segment width (e.g., trailing segment width minus leading segment width), which is measured in sample points and plotted along the X-axis, against the anomaly detection amplitude (indicating a peak-to-peak amplitude for each signal), which is measured in volts and plotted along the Y-axis. After inspecting each tire at the location of each anomaly, it was determined which sensed anomalies were attributed to reinforcement damage and which sensed anomalies were attributed to reinforcement joints. By doing so, anomalies associated with reinforcement joints were observed to have certain quantifiable signal amplitudes and differences in leading and trailing segment widths—so to arrive at a threshold width symmetry range. For example, for a tire type and sizes analyzed using particular Hall-Effect sensors, based upon the chart in FIG. 10, a threshold width symmetry range is a twenty-five (25) sample point difference.

Figure 11:
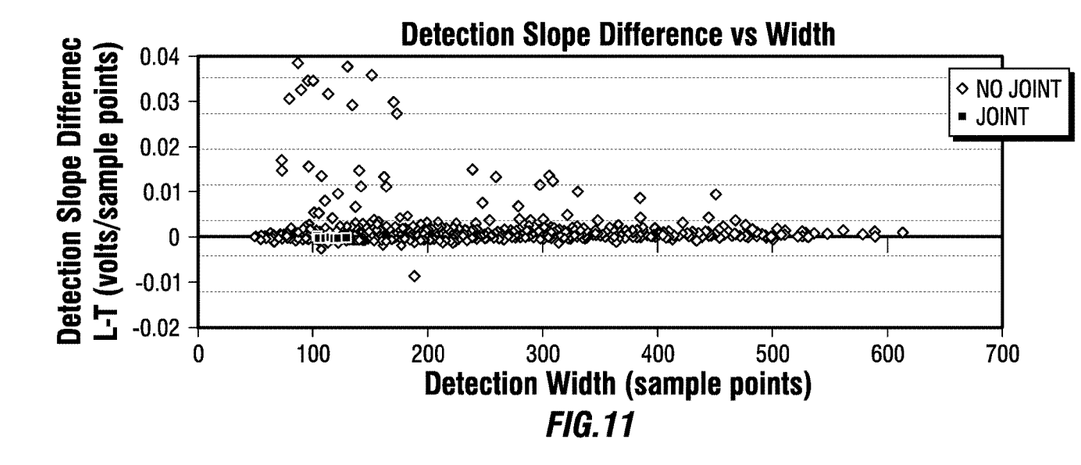
FIG. 11 is a chart showing anomalies previously identified by a sensing device based upon detection width (sample points) and a detection slope difference (a difference between leading and trailing slopes) (volts/samples), the anomalies each being identified as representing a damaged reinforcement or a joint along a reinforcement.

To determine a threshold slope limit, in particular instances, prior magnetic field responsive sensor samplings taken from particular tires are evaluated in conjunction with physical inspection of the tire at the location attributed to each detected anomaly to correlate the specific signal characteristic with anomalies that indicate a joint and with anomalies that indicate reinforcement damage. By example, with reference to FIG. 11, sensor samplings for a particular tire type and size and a particular sensor device are charted by plotting detection width, which is measured in sample points and is plotted along the X-axis, against the difference in slope between leading and trailing segments for each anomaly, which is measured in volts/sampling points and is plotted along the Y-axis. After inspecting each tire at the location of each anomaly, it was determined which sensed anomalies were attributed to reinforcement damage and which sensed anomalies were attributed to reinforcement joints. By doing so, anomalies associated with reinforcement joints were observed to have certain quantifiable signal amplitudes and differences in slope between leading and trailing segment—so to arrive at a threshold slope limit. For example, for a tire type and sizes analyzed using particular Hall-Effect sensors, based upon the chart in FIG. 11, a threshold width symmetry range is a 0.0005 volt/sampling point difference.

In a further effort to determine whether magnetic flux leakage occurs at a damaged location or at a joint, the tire is inspected externally for any visible external physical damage at least at the location of magnetic flux leakage. This may be accomplished by inspecting the entire tire more generally, or, after identifying the location of the magnetic flux leakage, inspecting the location where magnetic flux leakage is identified. If visible damage is identified, one may consider if the visible damage corresponds to any anomaly sensed. In accordance with a different approach, after an anomaly has been identified, an operator may then be prompted to inspect that location to determine if any visible damage is present—to ensure that the sensed anomaly does not indicate any reinforcement damage.

Because joints do not frequently arise in any one tire, the risk of misidentifying any joint as a damaged reinforcement can be minimized by eliminating tires that have a sufficiently high number of anomaly detections. Accordingly, the step of determining if the magnetic flux leakage occurs at a damaged location along the any one or more reinforcements or at a reinforcement joint may optionally include determining whether separate additional occurrences of magnetic flux leakage have been detected (in the step of detecting) along the tire and if so whether the quantity of separate occurrences are at or below a threshold maximum occurrence value, and where in determining that the magnetic flux leakage occurs at a joint arranged along the one reinforcement, it is determined that the quantity of separate occurrences are at or below the threshold maximum occurrence value. For example, this threshold maximum occurrence value may be 2 or 3 occurrences.

In view of the foregoing, in certain instances, magnetic flux leakage is determined to be occurring at a reinforcement joint:

(1) if the amplitude is at or above the threshold minimum amplitude value;
(2) if the width of the magnetic flux leakage is within the threshold width range;
(3) if the width for each magnetic flux leakage is sufficiently symmetric by being within the threshold width symmetry range;
(4) if the difference between the leading slope and the trailing slope of the magnetic flux leakage is less than the threshold slope limit; and,
(5) if no external physical damage is observed at the location of the magnetic flux leakage.

As noted previously, because the numerical values for the magnetic leakage parameters sensed and measured are dependent on the particular magnetic field responsive sensor and other electronic components employed, determination of these parameters may require trial and error and the evaluation of prior magnetic field responsive sensor samplings along particular tires in conjunction with physical tire inspection of the location attributed to each detected anomaly to correlate the specific signal characteristic with anomalies that indicate a joint and with anomalies that indicate reinforcement damage.

To the extent used, the terms "comprising," "including," and "having," or any variation thereof, as used in the claims and/or specification herein, shall be considered as indicating an open group that may include other elements not specified. The terms "a," "an," and the singular forms of words shall be taken to include the plural form of the same words, such that the terms mean that one or more of something is provided. The terms "at least one" and "one or more" are used interchangeably. The term "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (i.e., not required) feature of the embodiments. Ranges that are described as being "between a and b" are inclusive of the values for "a" and "b" unless otherwise specified.

While various improvements have been described herein with reference to particular embodiments thereof, it shall be understood that such description is by way of illustration only and should not be construed as limiting the scope of any claimed invention. Accordingly, the scope and content of any claimed invention is to be defined only by the terms of the following claims, in the present form or as amended during prosecution or pursued in any continuation application. Furthermore, it is understood that the features of any specific embodiment discussed herein may be combined with one or more features of any one or more embodiments otherwise discussed or contemplated herein unless otherwise stated.

What is claimed is:

1. A method of inspecting polymeric material within a tire, the polymeric material including one or more elongated ferrous reinforcements, the method comprising:
   applying a magnetic field to any one or more reinforcements, each of the one or more reinforcements being an elongated ferrous reinforcement;
   positioning an array of magnetic flux sensors near the one or more reinforcements;
   detecting magnetic flux leakage along any of the one or more reinforcements; and,
   determining if the magnetic flux leakage occurs at a damaged location along the one or more reinforcements or at a reinforcement joint, where the step of determining if the magnetic flux leakage occurs at a damaged location or at a reinforcement joint includes:
      determining whether an amplitude of the magnetic flux leakage is at or above a threshold minimum amplitude value;
      determining whether a width of the magnetic flux leakage is within a threshold width range;

determining whether the width of each magnetic flux leakage is sufficiently symmetric by being within a threshold width symmetry range;

determining whether a difference between a leading slope and a trailing slope of the magnetic flux leakage is less than a threshold slope limit;

inspecting externally the tire for any visible external physical damage at the location of the magnetic flux leakage; and, determining that the magnetic flux leakage occurs at a reinforcement joint if:

the amplitude is at or above the threshold minimum amplitude value;

the width of the magnetic flux leakage is within the threshold width range;

the width of each magnetic flux leakage is sufficiently symmetric by being within the threshold width symmetry range;

the difference between the leading slope and the trailing slope of the magnetic flux leakage is less than the threshold slope limit; and, no external physical damage is observed at the location of the magnetic flux leakage.

2. The method of claim 1, where the threshold minimum amplitude value is 0.03 volts.

3. The method of claim 1, where in determining that the magnetic flux leakage is a joint, the amplitude is also less than a threshold maximum amplitude value.

4. The method of claim 3, where the threshold maximum amplitude value is 0.2 volts.

5. The method of claim 1, where the threshold width range is 100 to 150 sample points.

6. The method of claim 5, where the threshold width range is 100 to 170 sample points.

7. The method of claim 1, where the threshold width symmetry range is an acceptable difference between a leading width and a trailing width.

8. The method of claim 7, where the acceptable difference is up to a 25 sample point difference.

9. The method of claim 1, where the threshold slope limit is less than a 0.0005 volt difference.

10. The method of claim 1, where the step of determining if the magnetic flux leakage occurs at a damaged location or at a reinforcement joint further includes determining whether separate occurrences of magnetic flux leakage have been detected in the step of detecting along the tire and if so whether the separate occurrences are at or below a threshold maximum occurrence value, and where in determining that the magnetic flux leakage occurs at a reinforcement joint, it is determined that the separate occurrences are at or below the threshold maximum occurrence value.

11. The method of claim 1, where prior to determining if the magnetic flux leakage occurs at a damaged location or at a reinforcement joint, the method includes:

determining a threshold minimum amplitude value, a threshold width range, a threshold width symmetry range, or a threshold slope limit.

12. A method of inspecting polymeric material within a tire, the polymeric material including one or more elongated ferrous reinforcements, the method comprising:

applying a magnetic field to any one or more reinforcements, each of the one or more reinforcements being an elongated ferrous reinforcement;

positioning an array of magnetic flux sensors near the one or more reinforcements;

detecting magnetic flux leakage along any of the one or more reinforcements; and, determining if the magnetic flux leakage occurs at a damaged location along the one or more reinforcements or at a reinforcement joint, where prior to determining if the magnetic flux leakage occurs at a damaged location or at a reinforcement joint, the method includes determining a threshold minimum amplitude value, a threshold width range, a threshold width symmetry range, or a threshold slope limit, and, where in determining the threshold minimum amplitude value, the threshold width range, the threshold width symmetry range, or the threshold slope limit, magnetic field responsive sensor samplings taken from one or more other tires are evaluated in conjunction with a physical inspection of the tire at the location attributed to one or more detected anomaly to correlate a specific signal characteristic with the one or more anomalies that indicate a joint and with one or more anomalies that indicate reinforcement damage.

* * * * *